(12) United States Patent
Schmitz

(10) Patent No.: US 9,046,118 B2
(45) Date of Patent: Jun. 2, 2015

(54) FASTENING DEVICE FOR A MODULE ELEMENT IN AN AIRPLANE

(75) Inventor: Guenter Schmitz, Jesterburg (DE)

(73) Assignee: Airbus Operations GmbH (DE)

( * ) Notice: Subject to any disclaimer, the term of this patent is extended or adjusted under 35 U.S.C. 154(b) by 476 days.

(21) Appl. No.: 13/148,440

(22) PCT Filed: Feb. 10, 2010

(86) PCT No.: PCT/EP2010/000821
§ 371 (c)(1),
(2), (4) Date: Oct. 17, 2011

(87) PCT Pub. No.: WO2010/091845
PCT Pub. Date: Aug. 19, 2010

(65) Prior Publication Data
US 2012/0034028 A1 Feb. 9, 2012

Related U.S. Application Data

(60) Provisional application No. 61/151,359, filed on Feb. 10, 2009.

(30) Foreign Application Priority Data

Feb. 10, 2009 (DE) .......................... 10 2009 008 188

(51) Int. Cl.
*F16D 1/00* (2006.01)
*F16B 2/18* (2006.01)
*F16B 21/09* (2006.01)

(52) U.S. Cl.
CPC ............... *F16B 2/185* (2013.01); *Y10T 403/55* (2015.01); *F16B 21/09* (2013.01)

(58) Field of Classification Search
USPC ......... 403/292, 408.1, 409.1; 411/34; 24/453, 24/458
See application file for complete search history.

(56) References Cited

U.S. PATENT DOCUMENTS

RE14,630 E * 4/1919 Abbott .......................... 215/359
3,402,958 A * 9/1968 Barry .............................. 292/62
(Continued)

FOREIGN PATENT DOCUMENTS

DE 19601919 A1 7/1997
DE 20004718 U1 9/2000
(Continued)

OTHER PUBLICATIONS

PCT International Search Report and Written Opinion for PCT/EP2010/000821 completed by the EP Searching Authority on May 19, 2010 (German text).
(Continued)

*Primary Examiner* — Michael P Ferguson
*Assistant Examiner* — Nahid Amiri
(74) *Attorney, Agent, or Firm* — Barnes & Thornburg LLP

(57) ABSTRACT

A fastening device for attaching a module element to a support structure in an aircraft includes a stud having a first end defining a broadened head configured to engage the support structure, a section which adjoins the head and defines a first lateral dimension and a second lateral dimension that is larger than, and is disposed at least substantially perpendicularly to, the first lateral dimension, and a second opposite end connected to a lever which is movable between open and closed positions relative to the stud. A bushing, which may be electrically conductive, is provided on and longitudinally movable along the stud, which is configured to contact the support structure and to support an outer wall of the module element. An eccentric may be actuated by the lever and is responsive to movement of the lever into the closed position to move the bushing along the stud towards the head.

25 Claims, 7 Drawing Sheets

(56) References Cited

U.S. PATENT DOCUMENTS

| | | | | |
|---|---|---|---|---|
| 3,705,505 | A | * | 12/1972 | Landow et al. .................. 70/99 |
| 3,800,064 | A | * | 3/1974 | Lusk ........................... 174/73.1 |
| 4,147,917 | A | | 4/1979 | Jelmorini |
| 4,267,742 | A | * | 5/1981 | Cabeza ................... 74/471 XY |
| 4,763,935 | A | * | 8/1988 | Bisbing .......................... 292/66 |
| 5,165,720 | A | * | 11/1992 | Hoblingre .................... 280/775 |
| 6,202,265 | B1 | * | 3/2001 | Caine .............................. 24/453 |
| 6,659,513 | B1 | * | 12/2003 | Ramsauer ...................... 292/66 |
| 7,059,025 | B2 | * | 6/2006 | Edland ............................ 24/458 |
| 7,159,945 | B2 | * | 1/2007 | Eppert ..................... 297/367 R |
| 7,549,199 | B2 | * | 6/2009 | Bugner ........................... 24/297 |
| 7,866,928 | B2 | * | 1/2011 | Schmitz ......................... 411/34 |
| 8,234,725 | B2 | | 8/2012 | Roth |
| 2005/0220568 | A1 | | 10/2005 | Fink |

FOREIGN PATENT DOCUMENTS

| | | |
|---|---|---|
| DE | 202007008376 U1 | 10/2007 |
| DE | 102008015648 A1 | 10/2009 |
| JP | S52-120248 A | 9/1977 |
| JP | S52-120248 A | 10/1977 |
| JP | S62-17834 | 2/1987 |
| JP | 2007-530894 A | 11/2007 |
| SU | 509731 A | 4/1976 |
| WO | 2009/014189 A1 | 1/2009 |
| WO | 2009/015162 A1 | 1/2009 |
| WO | 2009/118362 A1 | 10/2009 |

OTHER PUBLICATIONS (English translation) PCT International Search Report for PCT/EP2010/000821 completed by the EP Searching Authority on May 19, 2010.

Decision on Granting a Patent for Invention from the Russian Patent Office from a corresponding Application No. 2011135/12 (054402), dated Sep. 21, 2012 (4 pages).

Office Action from the Japanese Patent Office in a counterpart Japanese Patent Application No. 2011-548620, dated Jan. 22, 2013, including an English language translation thereof (6 pgs).

Third Office Action from the Chinese Patent Office in a counterpart Chinese Patent Application No. 20108007391.X, dated Oct. 12, 2013, including an English language summary of the claim rejections (7 pgs).

* cited by examiner

FASTENING DEVICE FOR A MODULE ELEMENT IN AN AIRPLANE

CROSS-REFERENCE TO RELATED APPLICATIONS

This application is the U.S. national phase of PCT/EP2010/000821 filed Feb. 10, 2010. PCT/EP2010/000821 claims the benefit under the Convention of German Patent Application No. 102009008188.7 and U.S. Provisional Patent Application No. 61/151,359 both filed on Feb. 10, 2009.

FIELD OF THE INVENTION

The present invention relates to a fastening device for the modular interior in transport means, in particular a fastening device for a module element in an aircraft, and a fastening system containing this fastening device.

BACKGROUND

The interior of an aircraft is subject to special requirements. A modular construction is frequently desirable to accelerate the final assembly through the installation of sub-assemblies and to simplify future maintenance. For precise adaptation, it must be possible to compensate tolerances, possibly during the final assembly. Undesired assembly positioning can occur, for example, when a module has to be fitted into a recess although a visible surface of the module does not terminate flush with adjoining edges of the recess.

Furthermore, the modules can include heavy supply units, such as those used for example for air conditioning or water supply and disposal on long haul flights. The fastening device has to be able to transfer the inertia forces of the heavy module to the aircraft structure, even in extreme situations such as a hard landing of the aircraft. If the fastening device were to break, for example in a hard landing, the risk of injury would be considerable owing to the proximity to passengers or the personnel using the module. For this reason, fastening devices for modules are designed, for example, to transfer forces of up to 10,000 N.

Even in a normal flying situation, the aircraft structure carrying a module is subject to vibrations caused by rotating engines and relatively minor air turbulences. Transferring these vibrations to the module can reduce its service life, thereby increasing the maintenance costs or even endangering flight safety.

The modules can contain electrical devices, in which case a potential equalization relative to the (electrical) ground of the aircraft is advantageous for their operational reliability. Modules which are not provided for electrical operation can also require a potential equalization. For example, as a result of the above-mentioned vibrations at material boundaries, it is possible for an electrostatic charge to build up which increases the risk of ignition, interferes with the functional capability of other devices or impairs the ease of use of the module.

A further feature is a simple foolproof operability of a fastening device for a module in an aircraft. For example, it may be necessary to replace the module outside regular maintenance intervals. In such a case, it would be advantageous for the fastening device to be operated preferably without tools and as quickly as possible, perhaps by the cabin crew.

The subsequently published document DE 10 2008 015 648 A1 describes a vacuum suction means for temporary fixing to a substantially smooth airtight fastening surface. The vacuum suction means can be used to lift objects whereby, to maintain the operational reliability, a vacuum display device can detect when a minimum negative pressure between a suction plate of the vacuum suction means and the fastening surface has not been reached. A negative pressure is built up as a result of changing the position of the suction plate in certain areas using a toggle lever or articulated lever.

The printed document DE 200 04 718 U1 discloses a push-in stud which is used to connect two components in through openings in the two components, which through openings are brought into congruence. By way of a toggle or articulated lever which is guided outwards, radially displaceably mounted latching means can be moved into a radially extending position.

Conventional fastening systems only fulfill the above-mentioned requirements in an aircraft to a limited extent. For example, existing fastening systems only transfer forces in individual directions, which is why a plurality of differently orientated attachments is required for each module. Although more complex fastening systems are capable of reducing the transfer of vibrations, they do not allow for assembly or disassembly without a special tool due to their complexity. Moreover, known fastening systems stipulate a potential equalization for individual components, which has to be connected to the ground of the aircraft in addition to the fastening system and therefore requires an additional assembly step.

SUMMARY

It is the object of the present invention to remedy this.

This object is achieved according to the invention by a fastening device for attaching a module element to a support structure in an aircraft. Accordingly, a stud is provided which has a broadened head at a first end for engaging in a support recess of the support structure and a section which adjoins the head and has a first lateral dimension and a second lateral dimension, which is disposed at least substantially perpendicularly to the first lateral dimension and is larger than the first lateral dimension. The stud is provided at an opposite second end with a lever which is connected to the stud for rotation and can be moved into an open position and a closed position. A bushing is provided on the stud so as to be longitudinally movable, which bushing is designed to support an outer wall of the module element and supports an electrically conductive leaf spring for contacting the outside of the outer wall on the one hand and the support structure on the other hand. An eccentric which can be actuated by the lever moves the bushing, during a movement of the lever into the closed position thereof, along the stud towards the head.

The broadened head on the stud can engage in the support recess of the support structure. By means of the lever connected to the stud for rotation, the stud can then be moved into a first rotational position in which that section of the stud which has the smaller first lateral dimension and the second lateral dimension is arranged such that it can be moved without substantial resistance in the support recess of the support structure by means of a narrowed guide or connecting section. In a second region of the support recess, which follows the guide section and is enlarged to the second lateral dimension, the stud can be moved by a further rotation of the lever into a second rotational position (locking position) in which the section of the stud is then arrested with radial form-fit. In the locking position, the second lateral dimension is preferably substantially perpendicular to the guide section. At the same time, the broadened head on the stud results in an axial form-fit which prevents a movement of the stud in the direction of the second end, i.e. the stud is anchored in tension-resistant manner in the support recess of the support structure.

In the closed position of the lever, a resilient bearing of the bushing attached to the stud in longitudinally movable manner can compensate axial tolerances or damp vibrations on the part of the support structure before they are transferred to the outer wall of the module element. At the same time, it is possible to achieve a potential equalization of the module element relative to the ground of the aircraft as a result of the electrical contact between the support structure and the leaf spring in the closed position, owing to the electrical conductivity of the leaf spring and as a result of the electrical contact between the leaf spring and the outer wall.

To further improve the potential equalization, the bushing can also be electrically conductive for improving the electrical contact between the leaf spring supported by the bushing and the outer wall likewise supported by the bushing and for enabling a potential equalization through a contact produced between the bushing and the support structure when the bushing moves along the stud in the direction of the head. To this end, one or more projections can be attached to the bushing for contacting the support structure at one or more bearing points.

The leaf spring can be formed so that a surface contact with the support structure takes place in the closed position. At least one end of the leaf spring, which is parallel with the support structure, can be designed for surface contact. Alternatively, the leaf spring can have at least one bearing point for contacting the support structure. The bearing point can be realized by a local, for example hemispherical, deformation of the leaf spring for increasing the surface pressure locally to improve the electrical contact. Furthermore, the bearing point can release the contact point during vibrations on the part of the support structure and therefore prevent possible impairment of the electrical contact, perhaps resulting from surface oxidation.

The object is alternatively achieved by a fastening device for attaching a module element to a support structure in an aircraft. Accordingly, a stud is provided which has a broadened head at a first end for engaging in a support recess of the support structure and a section which adjoins the head and has a first lateral dimension and a second lateral dimension, which is disposed at least substantially perpendicularly to the first lateral dimension and is larger than the first lateral dimension. The stud is provided at an opposite second end with a lever which is connected to the stud for rotation and can be moved into an open position and a closed position. Provided on the stud, there is an electrically conductive bushing, which is attached in longitudinally movable manner and is designed to support an outer wall of the module element and to contact the support structure. An eccentric which can be actuated by the lever moves the bushing, during a movement of the lever into the closed position thereof, along the stud towards the head.

An actuation of the fastening device by way of the lever takes place as described above. Again, the engagement of the broadened head of the stud produces an axial form-fit in the support recess of the support structure, which prevents a movement of the stud in the direction of the second end. Moreover, a radial form-fit is achieved in the locking position due to the enlarged second lateral dimension of the section of the stud. At the same time, the electrical contact between the support structure and the bushing in the closed position of the lever and the electrical conductivity of the bushing supporting the outer wall enable a potential equalization of the module element relative to the ground of the aircraft. By dispensing with a leaf spring, the fastening device can be manufactured more favorably and there are fewer individual parts to assemble.

Both embodiments can be advantageously further modified by the following features.

The bushing can be designed to block the movement of the lever into its closed position when the stud is in its first rotational position. By blocking the movement of the lever, it is possible to prevent faulty operation of the fastening device or inadequate fastening of the module element to the support structure in that a user is made aware when the stud is in a rotational position in which radial locking of the stud is not possible.

The eccentric can be constructed in one piece with the lever, which reduces the manufacturing costs of the fastening device and increases the stability.

To lock the fastening device in its closed state, the bushing can have, on its outer circumference, a flattened locking portion for cooperating with a locking projection of the lever in order to couple the lever to the bushing in rotationally fixed manner in the closed position of the lever. The lever is thus locked against rotation. The flattened locking portion on the bushing can be disposed at a position corresponding to the locking position of the lever. This also results in the stud being locked against rotation relative to the bushing because the lever for rotating the stud is connected to this latter.

The bushing can furthermore be designed to receive the outer wall and/or the leaf spring with form-fit. In particular, a segment which deviates from a round profile can be constructed for rotationally-fixed seating on the bushing. The segment can be designed for example as a groove (in particular as a T-shaped groove) or as a flattened portion on the outer circumference of the bushing. In a structurally advantageous construction, the outer wall of the module element and/or the leaf spring has a through recess which receives the bushing in rotationally fixed manner. For example, the through recess in which the bushing engages in rotationally fixed manner can be formed substantially complementarily to the circumference of the bushing. In addition, the bushing can have a protrusion, for example a flange, so that the outer wall and/or the leaf spring can be braced between a clamping disc and the projection. The outer wall or the leaf spring can also be braced separately, for example between two clamping discs.

According to a preferred embodiment, the flattened locking portion provided for cooperating with the locking projection of the lever at the same time produces the form-fit between the bushing and the outer wall of the module element and/or the leaf spring. This enables particularly simple manufacture of the fastening device and results in the stud also being locked against rotation relative to the outer wall of the module element when the lever assumes its closed position.

According to a further development of the invention, to enable the lever to also be arrested in its open position, a radial groove in which a corresponding projection protruding from the eccentric engages in the open position of the eccentric or the lever connected thereto is formed in an end face of the bushing which faces the eccentric or the lever. At the same time, this also results in the stud being locked against rotation relative to the bushing in the open position of the lever. According to an advantageous further modification of this embodiment, a second radial groove is present in an end face of the bushing and is arranged such that the two radial grooves form an angle of 90° between them. Assembly of the fastening device according to the invention is simplified in that, by means of the two radial grooves arranged as described, the unlocking position and the locking position of the stud can also be defined in the open position of the lever and identifiably determined by a user. For example, if a user opens the lever located in the closed position in order to release the fastening device and remove a module element fastened thereby, he then needs to rotate the lever merely through 90 degrees out of the first latching groove and into the second latching groove and he then knows that the stud, more precisely that section of the stud which has the two different lateral dimensions, has assumed its unlocking position in which the stud can be removed from the support recess.

The engagement of the stud in the support recess of the support structure by means of the broadened head can be facilitated by a form of the head which tapers towards the first end. A head constructed as a cone or truncated cone can advantageously serve as a guide aid during assembly.

To facilitate the insertion of the fastening device into the recess of the support structure, a compression spring acting between the bushing and the head of the stud can pretension the stud in an assembly/disassembly position. The bushing can move into contact with the eccentric under the action of the compression spring. The assembly and disassembly position can therefore correspond to the closed and open position of the lever. By way of the eccentric, the force of the compression spring can also react on the lever actuating the eccentric. As a result of this reaction, the movement of the lever can have a defined dead center, with the lever springing automatically into the closed position when this is exceeded. The lever can thus be additionally locked against inadvertent opening or opening caused by vibrations. Moreover, a snap mechanism of this type can clearly confirm to the user whether the closed position has been reached. Furthermore, tolerances in the axial direction can be compensated by the compression spring.

The compression spring is advantageously supported on the section of the stud. By means of a suitable axial dimensioning of the section, it is thus possible to prevent the compression spring bearing against the support structure and causing disadvantageous friction forces during assembly. Furthermore, the compression spring can be electrically conductive, thus enabling the realization of a further conductive path from the outer wall by way of the bushing and the stud to the support structure on the aircraft.

To further improve the electrical conductivity, the bushing can have an electrically conductive coating. The electrical contact between the outer wall and the bushing, the leaf spring and the bushing or the support structure and the bushing can be improved by way of this coating.

The object mentioned at the outset is further achieved by a fastening system which comprises at least one fastening device constructed as described above and a support structure. The support structure has at least one support recess with a first region, a second region and a guide section connecting the first region to the second region. The first region enables the head on the stud of a fastening device to pass through. The second region has a diameter which corresponds to the second lateral dimension of the section on the stud of the fastening device. Apart from normal tolerances, a lateral dimension of the guide section can correspond to the first lateral dimension of the section on the stud of the fastening device.

In the first rotational position of the stud, the guide section enables a displacement of the stud from the first region into the second region of the support recess. The lateral dimension of the guide section, which corresponds to the first lateral dimension, can be substantially equal to the first lateral dimension of the stud or it can be between the first and second lateral dimension. For example, the lateral dimension of the guide section can be 5% greater than the first lateral dimension of the stud. For example, the second lateral dimension can be twice the size of the first lateral dimension.

The first region of the support recess is advantageously disposed above the second region. Therefore, during the assembly of the module element, after the head of the stud has been inserted into the upper first region of the support recess, the section on the stud can slide into the second region with the aid of the gravitational force.

BRIEF DESCRIPTION OF THE DRAWINGS

A preferred embodiment of the invention is now explained in more detail with reference to the accompanying drawings, which show.

DETAILED DESCRIPTION OF THE DRAWINGS

Figure 1:
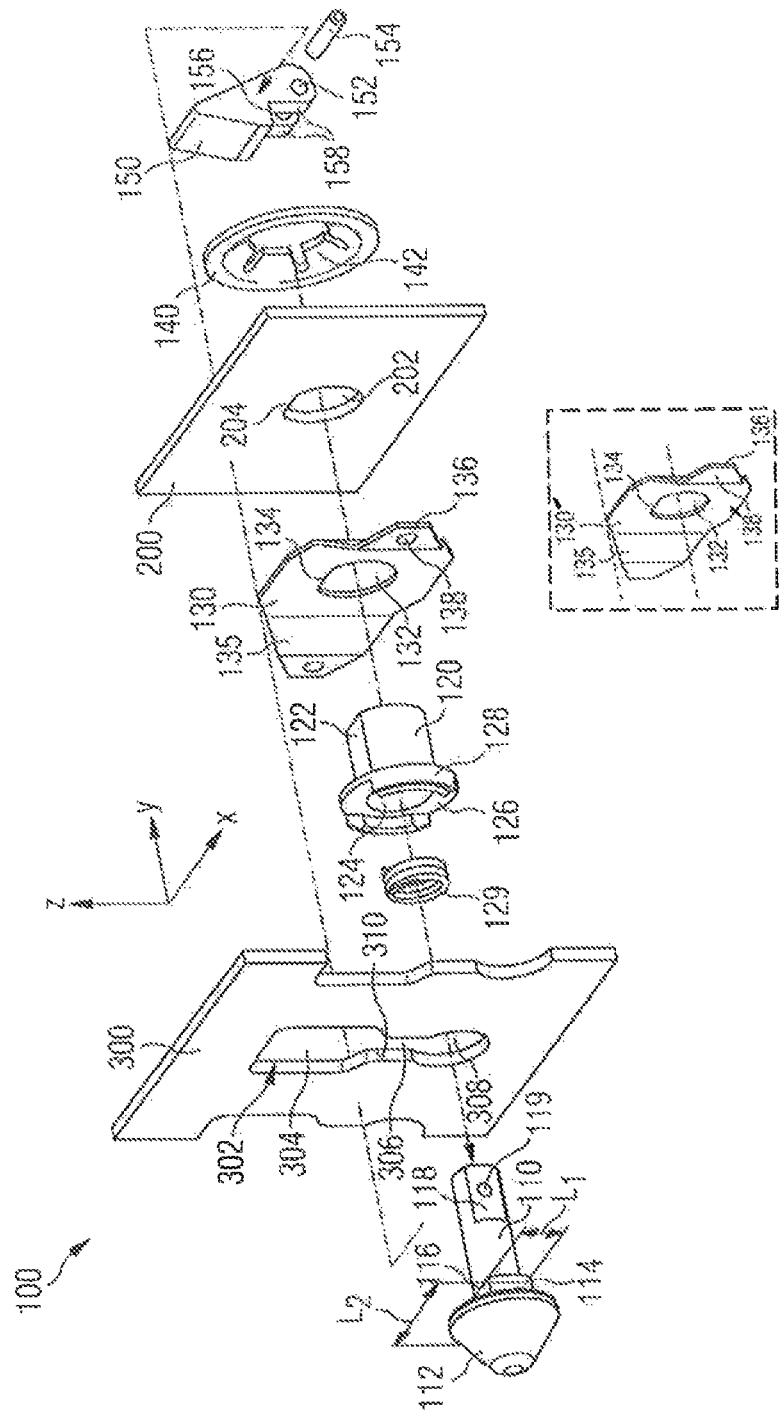
FIG. 1A an exploded three-dimensional illustration of an embodiment of a fastening device according to the invention.
FIG. 1B a perspective view of an alternate embodiment of the leaf spring illustrated in FIG. 1A.

FIG. 1A shows an embodiment (denoted as a whole by 100) of a fastening device for fastening a module element to an aircraft structure. Features on the module side are denoted by reference numerals 2xx, features on the aircraft side are denoted by 3xx.

The fastening device 100 comprises a stud 110 which has, at its end shown on the left in FIG. 1A, a broadened head 112 and a section 114 following this in the axial direction. The section 114 with a circular cylindrical basic form has two mutually parallel flattened portions 116 which, between them, define a first lateral dimension $L_1$. Perpendicular to the first lateral dimension $L_1$, the section 114 has a second lateral dimension $L_2$ which is greater than the first lateral dimension $L_1$ and corresponds to the diameter of the circular cylindrical basic form of the section 114. The two circle segments of the section 114 thus lie on an imaginary lateral cylinder surface coaxial with the stud 110. In the embodiment of the fastening device 110 shown, the diameter of the stud 110 after the section 114 corresponds to the first lateral dimension $L_1$. Two mutually parallel flattened portions 118 and a radial through bore 119 are constructed at the opposite end (shown on the right in FIG. 1A) of the stud 110.

The fastening device 100 further comprises a bushing 120 whereof the cylindrical circumference is interrupted by a flattened locking portion 122. The bushing 120 has an axial through recess 124 for receiving the stud 110 in slideable manner. That end of the bushing 120 which faces the section 114 of the stud 110 has a radially outwardly projecting flange 126 with two circle-segment shaped projections 128 protruding axially from it in the direction of the head 112.

Accommodated in a region radially within the projections, there is a helical spring 129 which is constructed as a compression spring and is supported on a step (not shown in FIG. 1A) in the through recess 124. If the stud 110 is inserted in the through recess 124 of the bushing 120, the other end of the helical spring 129 is supported on the section 114 of the stud 110.

The fastening device further comprises a leaf spring 130 made from an elastic and electrically conductive material, preferably stainless steel. The leaf spring 130 has a through recess 132 for receiving the bushing 120 in rotationally fixed manner by means of a flattened portion 134 at a point corresponding to the flattened locking portion 122. The form of the through recess 132 thus corresponds to the profile of the bushing 120 so that the leaf spring 130 is connected to the bushing 120 with form-fit with regard to a rotation when it is positioned on this latter. Alternatively to the individual flattened locking portion 122 with the corresponding individual flattened portion 134, it is also possible to construct a plurality of flattened portions in each case on the bushing 120 and leaf spring 130. For example, the profile of the bushing 120 and the through recess 132 can be a polygon profile. It is also possible to realize a rotationally fixed seating of the leaf spring 130 on the bushing 120 by means of serrations. In general, a rotationally fixed anchoring can be achieved by an anchoring segment deviating from a round profile.

The leaf spring 130 has an approximately plate-shaped cross-section with two arms 135, whereof the ends 136 form substantially parallel surfaces on which a contact projection, which is dome-shaped here, is provided in each case as a bearing point 138 as shown in the embodiment illustrated in FIG. 1A. In an alternative embodiment of the leaf spring 130' illustrated in FIG. 1B, the substantially parallel surfaces 138' of the ends 136 of the leaf spring 130' are designed for surface contact.

A clamping disc 140 has two lamellae 142 with cutting edges on a circular circumference which is somewhat smaller than the first lateral dimension $L_1$ of the stud 110. The clamping disc 140 can be pushed irreversibly onto the stud 110 so that it is braced there against removal of the clamping disc 140 by the lamellae 142 cutting into the surface of the stud 110.

A lever 150 has a through bore 152 which can be moved into congruence with the through bore 119 in the stud 110 by means of the flattened portions 118. The lever 150 can be pivotably fastened to the stud 110 by means of a pin 154. A torque can be transferred by the lever 150 for rotating the stud 110 about its central longitudinal axis. Furthermore, the lever 150 has a locking projection 156 whereof the height corresponds to the height of the flattened locking portion 122 on the bushing 120. The lever 150 also has two projections constructed as eccentrics 158 relative to the pivot axis about the pin 154.

An outer wall 200 of a module element is shown as a carrier plate of the module in FIG. 1A. In a modified embodiment, a module element with a curved outer wall (not shown) can also be attached to the aircraft structure. In both embodiments, a through recess 202 is present in the outer wall 200 on the module side for attachment by means of the fastening device 100. Similar to the through recess 132 on the leaf spring 130, the through recess 202 of the outer wall 200 also has a flattened portion 204. The outer wall 200 can therefore be positioned on the bushing 120 in rotationally fixed manner together with the leaf spring 130. In the assembled state, the flange 126 on the bushing 120 and the clamping disc 140 serve for bracing the leaf spring 130 located between them and the outer wall 200, as explained in more detail below.

A support structure 300 with a support recess 302 is provided on the aircraft side. The support recess 302 is divided into a first region 304, a guide section 306 and a circular second region 308. The approximately rectangular first region 304 is sufficiently dimensioned in terms of its length and width to enable the broadened head 112 of the stud 110 to pass through. The guide section 306 has two parallel guide faces 310 which have a spacing between them which is substantially equal to the first lateral dimension $L_1$ including a slight play for movably receiving the section 114.

A section 114 of the stud 110 which is guided into the first region 304 can be rotated through 90 degrees into a first rotational position (unlocking position) relative to the rotational position shown in FIG. 1A. The flattened portions 116 can then slide downwards along the parallel guide faces 310. The section 114 of the stud 110 is thus moved into the circular second region 308 of the support recess 302 of the support structure 300. There, the stud 110 can be brought into a second rotational position (locking position) by a further rotation through 90 degrees by means of the lever 150. This results in a form-fit of the stud 110 in the support recess 302 relative to the plane of the support structure 300. At the same time, owing to the broadened head 112, the stud 110 is unable to escape from the support recess 302 of the support structure 300 in the axial direction through the circular second region 308.

Figure 2:
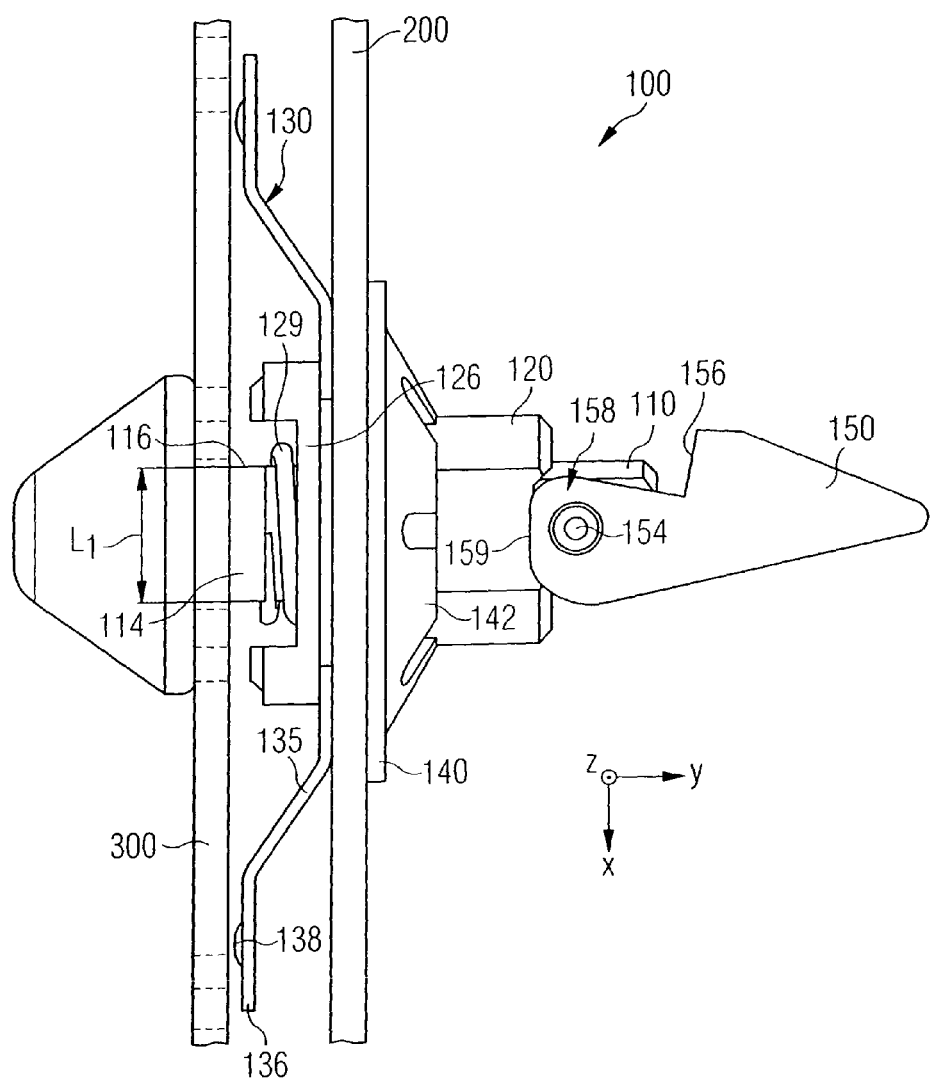
FIG. 2 a side view of the embodiment of FIG. 1A in an open state.

In FIG. 2, the embodiment of the fastening device 100 is shown in the unlocking position. The side view of FIG. 2 shows a view towards the Z axis shown in FIG. 1A. The stud 110 is located in the first rotational position, so that the flattened portions 116 of the section 114 in the side view of FIG. 2 are shown at a spacing of the first lateral dimension $L_1$. The stud 110 can be inserted into the support structure 300 in this first rotational position.

During the insertion of the stud 110 into the support structure 300, the lever 150 assumes its open position shown in FIG. 2. Under the action of the helical spring 129, the bushing 120 abuts with its annular end face against a first flattened eccentric portion 159 of the eccentric 158. At the same time, the bushing 120 which is slideably arranged on the stud 110 assumes a position remote from the support structure 300 in the open position. The leaf spring 130 connected to the bushing 120 is thus lifted from the support structure 300 and the bearing points 138 on the two surfaces 136 do not contact the support structure 300, or only contact it with a slight contact pressure. Thus, a low-friction sliding of the flattened portions 116 along the guide faces 310 in the guide section 306 of the support structure 300 is possible in the open position of the lever 150. At the same time, an alignment of the outer wall 200 can be corrected with little effort.

The leaf spring 130 abuts against the flange 126 of the bushing 120, whilst the outer wall 200 in turn abuts against the leaf spring 130. An electrical contact is thus achieved between the outer wall 200 and the leaf spring 130. Sustained existence of the electrical contact is ensured by the bracing of the leaf spring 130 and the outer wall 200 between the flange 126 and the clamping disc 140. In the embodiment shown, the bushing 120 is electrically conductive due to a nickel coating. As a result of the likewise electrically conductive clamping disc 140, there is a further conductive path from the outer wall 200 to the bushing 120 by way of the clamping disc 140 with its lamellae 142 cutting into the nickel coating of the bushing 120.

A movement of the lever 150 into its closed position is impossible in the unlocking position of the lever 150 shown in FIG. 2, because the locking projection 156 on the lever 150 sits deeper than an outer diameter of the bushing 120. If the lever 150 were pivoted about the pin 154 in the unlocking position shown in FIG. 2, the locking projection 156 would strike the end of the bushing 120 facing the lever 150 and thus prevent the closed position from being reached.

Figure 3:
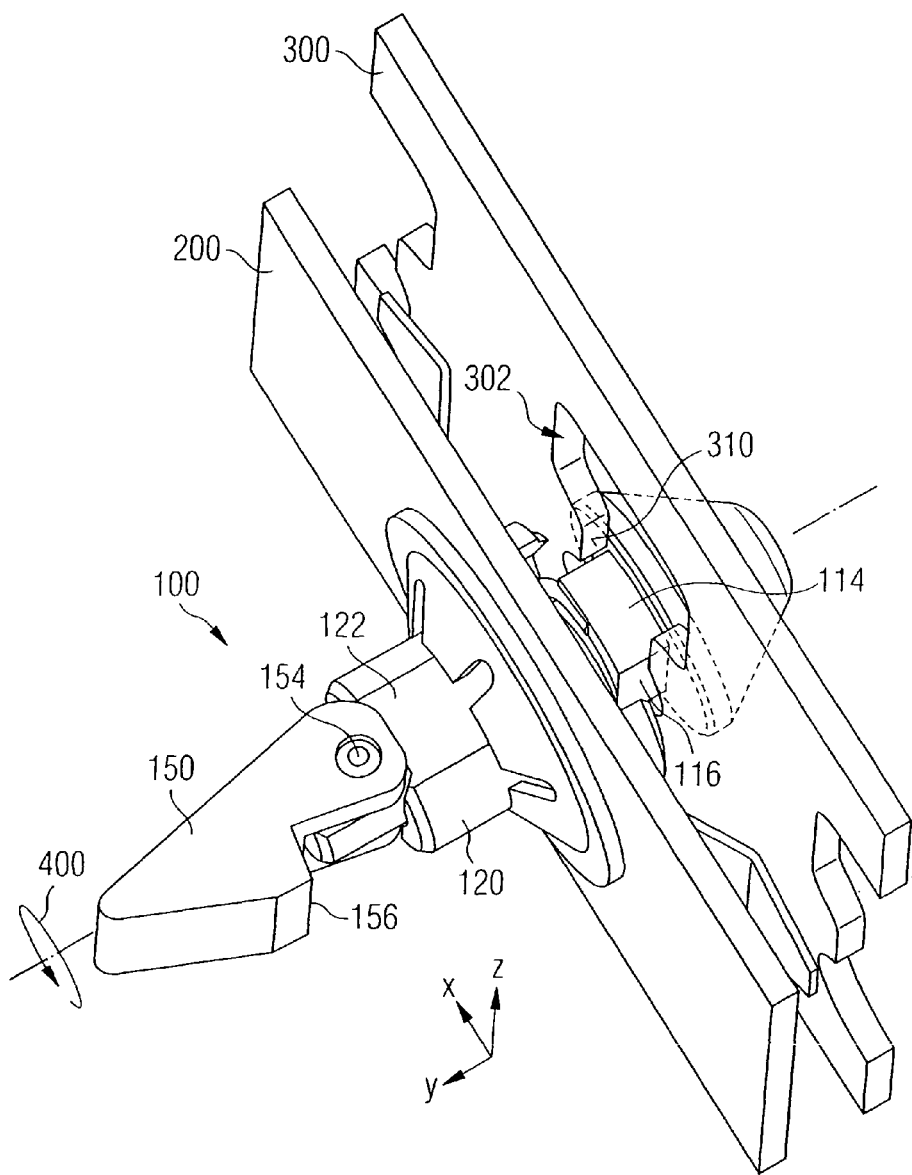
FIG. 3 a three-dimensional illustration of the embodiment in the open state.

FIG. 3 shows the embodiment of the fasting device in the same state as in FIG. 2 from a different perspective. The unlocking position of the stud 110 is shown on the flattened portions 116 of the stud section 114 which are parallel with the guide faces 310. As explained with reference to FIG. 2, the movement of the lever 150 into the closed position is prevented by a premature cooperation of the locking projection 156 on the lever 150 with the end of the bushing 120 which faces the lever. Starting at the open lever 150, a rotational movement through 90 degrees in the direction denoted by an arrow 400 causes the pin 154 forming the pivot axis of the lever 150 and the stud 110 to be rotated. In this locking position, a pivotal movement 500 of the lever 150 about the pin 154 brings the locking projection 156 into contact with the flattened locking portion 122 on the bushing 120. This closed position is explained in more detail below.

Figure 4:
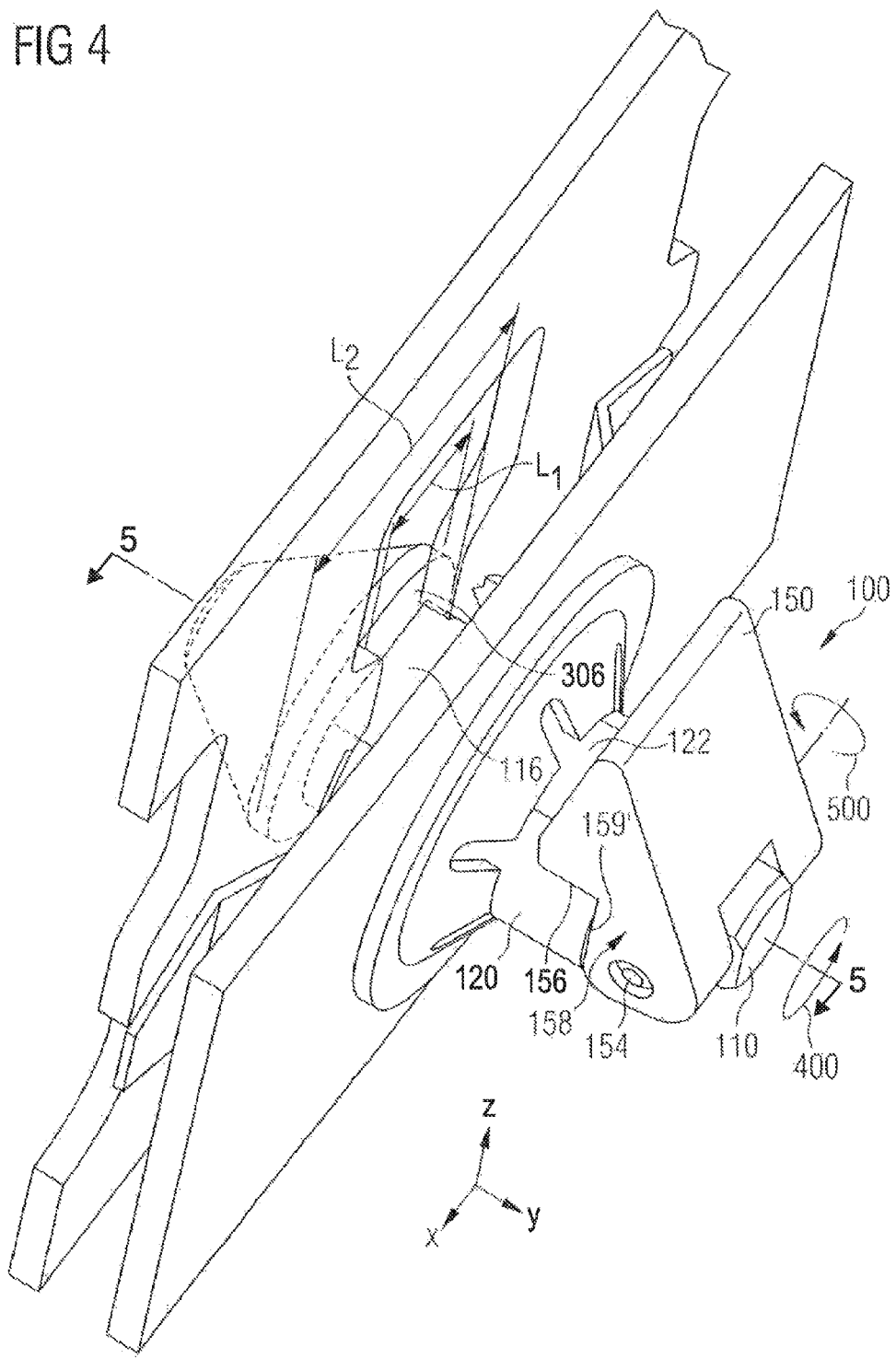
FIG. 4 a three-dimensional illustration of the embodiment in a closed state.

FIG. 4 shows the embodiment of the fastening device 100 in the locking position of the stud 110 and in the closed position of the lever 150 after the corresponding rotation 400 and pivotal movement 500 have been executed at the lever 150. The section 114 is positioned with its larger second lateral dimension $L_2$ transverse to the guide section 306 and the locking projection 156 abuts against the flattened locking portion 122.

Under the action of the helical spring 129 (not shown in FIG. 4), the bushing 120 is pressed against a second flattened eccentric portion 159' of the eccentric 158. This contact pressure ensures the closed position of the lever 150. At the same time, the contact pressure on the eccentric 158 produces a snap effect of the lever, which gives the lever a dead centre beyond which the lever automatically springs into its open or closed position. Furthermore, as a result of the locking projection 156 bearing on the flattened locking portion 122, the lever 150 is locked against rotation with the bushing 120. Owing to the rotationally fixed connection between the lever 150 and stud 110 by means of the pin 154, the cooperation between the flattened locking portion 122 and the locking projection 156 also locks the stud 110 against rotation.

Figure 5:
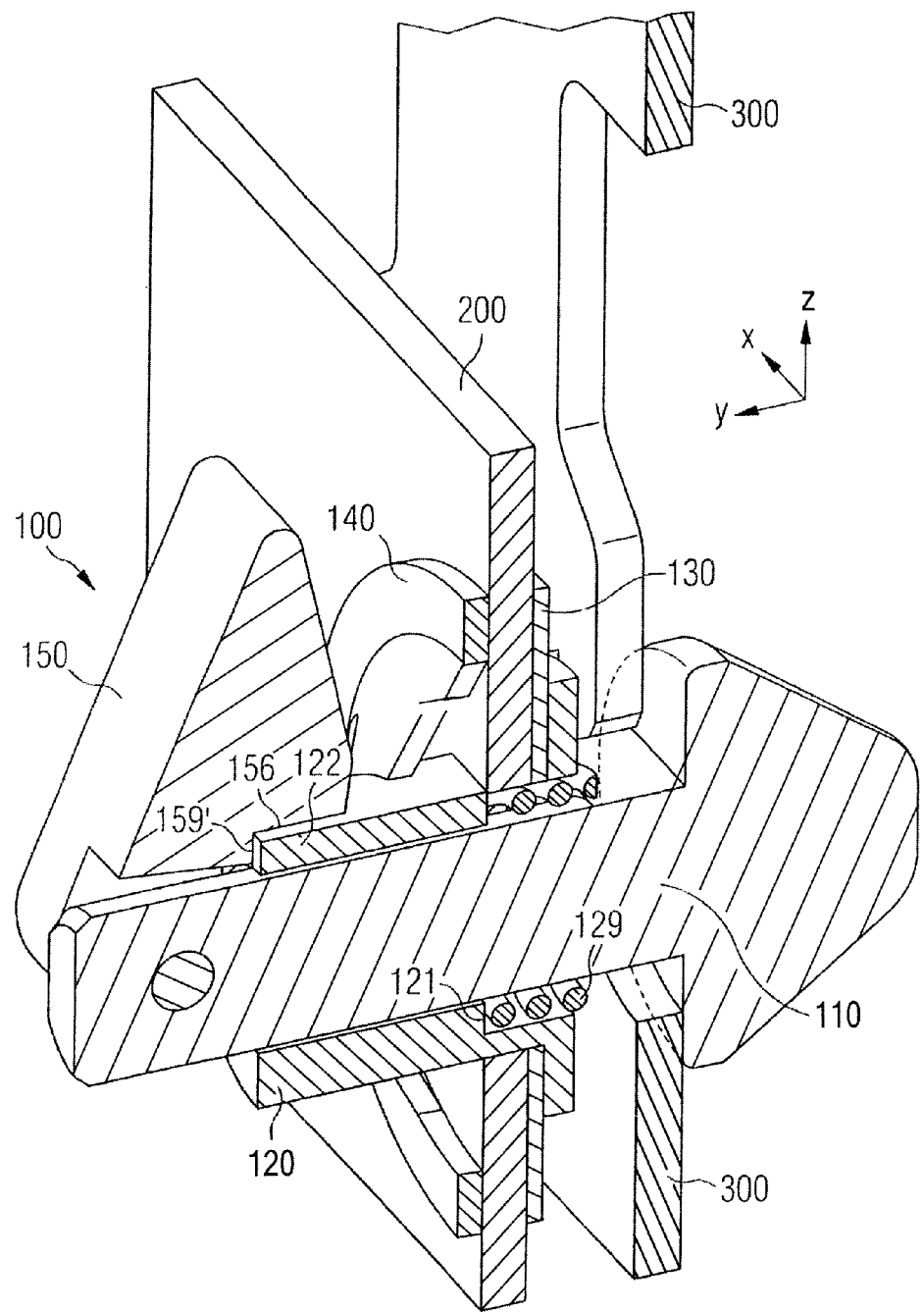
FIG. 5 a sectional view of the embodiment in the closed state.

FIG. 5 shows the embodiment of the fastening device 100 in the same closed state as in FIG. 4 in a sectional view along the longitudinal axis of the stud 110. This illustration clearly shows the locking projection 156 abutting against the flattened locking portion 122. FIG. 5 also shows how the movement of the lever 150 into the closed position illustrated brings the second flattened eccentric portion 159' into contact with that end of the bushing 120 which faces the lever, whereby the helical spring 129 abutting against the step 121 is compressed. At the same time, the lever 150 pulls the stud 110 out of the bushing 120 in the direction of the lever 150, as a result of which the outer wall 200 braced on the bushing 120 by way of the clamping disc 140 and the leaf spring 130 are moved towards the support structure 300.

Figure 6:
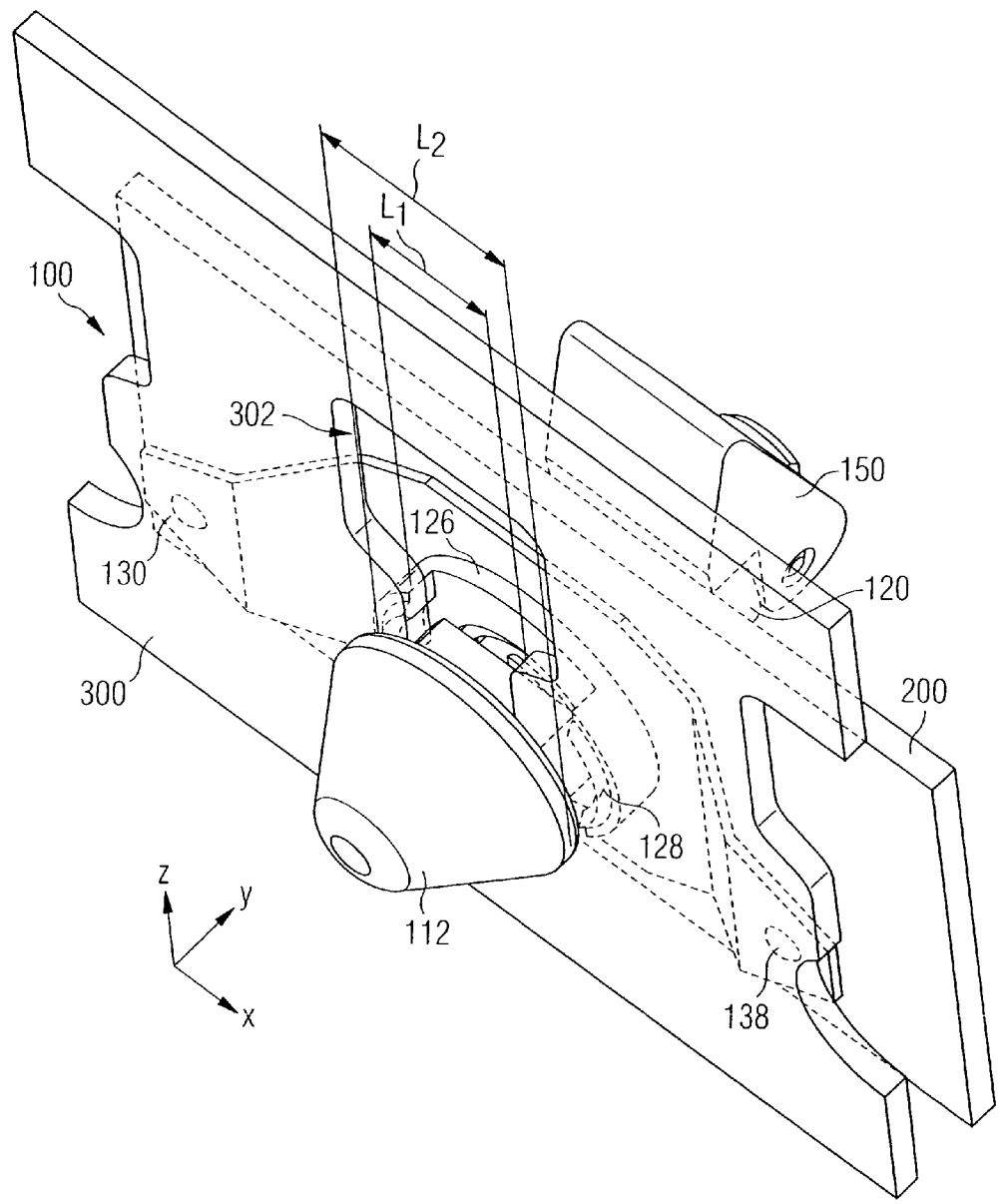
FIG. 6 a transparent three-dimensional illustration of the embodiment in the closed state.

FIG. 6 shows the electrical and mechanical contact with the support structure 300, which is produced during this movement towards the support structure 300. The movement of the bushing 120 in the direction of the support structure 300 overcomes a small spacing (shown in FIG. 2) between the bearing point 138 and the support structure 300. From the path covered overall by the bushing 120 along the stud 110 and from a spring constant of the leaf spring 130, a defined contact pressure force is produced between the bearing point 138 and support structure 300. From the resultant friction force and from the spacing between the bearing point 138 and the axis of the stud 110, a defined torque is furthermore produced, which opposes a rotation of the fastening device 100.

In the embodiment of the fastening device 100 shown in FIG. 6, a height of the circle-segment shaped projections 128 on the flange 126 of the bushing 120 is dimensioned such that, in the closed position, the projections 128 abut against the support structure 300. This arrangement creates a further conductive path between the outer wall 200 and the support structure 300 due to the nickel coating of the bushing 120. Furthermore, a contact pressure of the fastening device 100 can be increased by way of the projections 128. Also in the embodiment with abutting projections 128, the conductive path advantageously supplements the potential equalization of the outer wall 200 by way of the electrically conductive leaf spring 130, since the leaf spring 130 rubs against the bearing points 138 as a result of vibrations on the part of the support structure 300. As a result, oxidation or contamination between the bearing point 138 and support structure 300 is prevented or removed.

In an alternative embodiment, a plurality of projections, for example punctiform projections, can replace the circle-segment shaped projections 128 shown. The projections 128 can moreover be elastic to achieve a compromise between an axial damping of vibrations and a high contact pressure. A relatively high axial damping of vibrations on the part of the support structure 300 can be achieved in an embodiment without projections 128 abutting against the support structure 300 in that only the leaf spring 130 is used for soft damping.

In addition, a further axial projection can be provided on the flange 126 for engaging in preferably the first region 304 of the support recess 302 of the support structure 300 (not illustrated). This engaging projection has a height which is dimensioned such that, in the open position of the lever, it does not interfere with the insertion of the head 112 into the support recess 302 and, in the closed position of the lever, engages in the support recess 302 so that a rotation of the fastening device 100 relative to the support structure 300 is prevented by form-fit.

Figure 7:
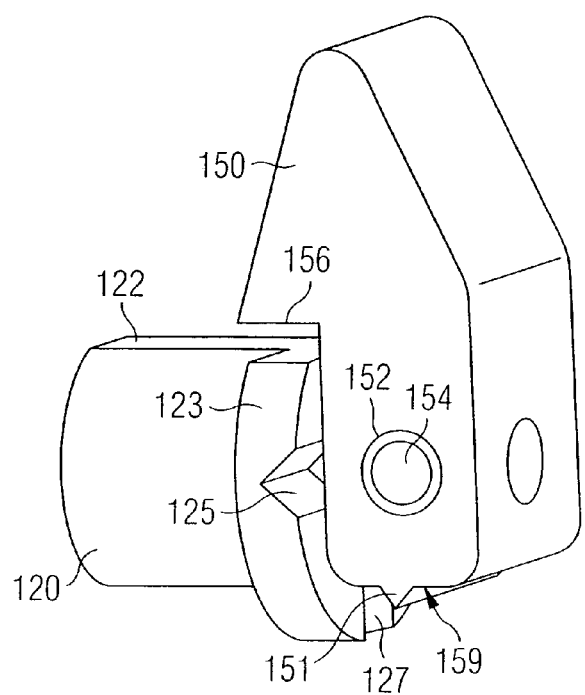
FIG. 7 a three-dimensional illustration of a further development of the embodiment.

FIG. 7 shows an embodiment of the fastening device 100 which has been developed further in terms of the cooperation between the lever 150 and the bushing 120. For greater clarity, only an end portion of the bushing 120 which faces the lever and the lever 150 abutting against this end portion in its closed position are shown as a detail in FIG. 7. A radially protruding flange 123 is constructed on the end of the bushing 120 which faces the lever. A first V-shaped groove 125, which extends diametrically through the longitudinal axis of the bushing and is parallel with the flattened portion 122, is incorporated in the flange 123. A second V-shaped groove 127, which likewise extends diametrically in the flange 123, is substantially perpendicular to the first V-shaped groove 125.

On the lever 150, a projection 151 projects from the first flattened eccentric portion 159 parallel with the through bore 152 receiving the pin 154. The projection 151 has a complementary cross-sectional profile for form-fitting engagement in the first V-shaped groove 125 or the second V-shaped groove 127. Thus, in the open position through a rotation of the lever 150, the projection 151 can latch optionally in the first V-shaped groove 125 or in the second V-shaped groove 127 under the action of the spring force of the helical spring 129.

As a result of this latching action, the lever 150 and bushing 120 are coupled in rotationally fixed manner. Here, a latching in the first V-shaped groove 125 corresponds to the locking position of the stud 110 and a latching in the second V-shaped groove 127 corresponds to the unlocking position of the stud 110. The two latches determine the locking and unlocking position of the stud 110 accordingly in the open position of the lever 150 and thus facilitate assembly of the fastening device since, as a result of the latching engagement in the second V-shaped groove 127, the unlocking position of the stud 110 is already secured during the insertion of the stud 110 into the support recess 302. Furthermore, as a result of the latching engagement in the first V-shaped groove 125, the locking position is already indicated to the user before the lever 150 is closed.

The fastening device 100 can serve for fastening the module element in any spatial orientation. For example, the support recess 302 of the support structure 300 can extend vertically (gravitational force in the Z-direction of the coordinate system shown). Furthermore, the fastening device 100 can fasten the module element to a floor or to a ceiling of the aircraft (gravitational force in the Y-direction of the coordinate system shown).

The outer wall of the module element 200 an be connected to a support structure 300 of the aircraft by a single fastening device 100. For better load distribution or to further secure the outer wall 200 against rotation, a plurality of structurally similar fastening devices 110 can be disposed next to one another and/or below one another on the outer wall 200. To simplify and accelerate the assembly of a module element with outer wall 200, four attachment points are preferably provided (not shown). Two fastening devices 100 disposed in the upper region of the outer wall 200 enable active bracing through the movement of the lever 150 into the closed position. Two further passive attachment points in the lower region do not have a lever 150 and have, instead of the longitudinally movable and adjustable stud 110, a stud which is rigidly connected to the outer wall 200. During assembly, the passive attachments at the same time engage with the active attachment points in correspondingly positioned support recesses 302 in the support structure 300. The active attachment points here ensure the positioning of the rigid stud in the corresponding support recesses 302.

The fastening device 100 enables simple, rapid and reliable fastening of a module element to a support structure 300 in an aircraft. In addition to the mechanical attachment of the outer wall 200 of the module element to the support structure 300, the fastening device 100 at the same time produces a reliable electrical connection for potential equalization of the module element relative to the ground of the aircraft. Moreover, the materials for the projections 128 and the leaf springs 130 can be selected to realize a defined damping in the axial direction.

As a result of the cooperation between the form-fitting locking position of the stud 110 and the rotationally locked closed position of the lever 150, the fastening device is reliable, user-friendly and safeguarded against faulty operation. Module elements, particularly electrical devices in an aircraft, can thus be readily replaced or updated.

What is claimed is:

1. A fastening device for attaching a module element to a support structure in an aircraft, the fastening device comprising:
   a stud having a first end defining a broadened head configured to engage in a support recess of the support structure and a section which adjoins the head and defines adjacent to the head first and second lateral dimensions, the second lateral dimension larger than the first lateral dimension and disposed at least substantially perpendicularly to the first lateral dimension, the stud further having a second end opposite the first end, the second end connected to a lever which is movable between open and closed positions relative to the stud,
   a bushing provided on and longitudinally movable along the stud, the bushing supporting an electrically conductive leaf spring and configured to support an outer wall of the module element, the leaf spring configured to contact an outside of the outer wall of the module element, the leaf spring having, outside of the bushing, one of a surface contact means and at least one bearing point configured to contact the support structure, wherein the bushing defines an outer circumference between the broadened head and the second end of the stud, at least a portion of the outer circumference having a flattened locking portion, wherein the outer circumference of the bushing form-fittingly receives the leaf spring and is configured to receive the outer wall of the module element in a form-fitting manner, and wherein the flattened locking portion produces the form-fitting between the bushing and the outer wall of the module element and the leaf spring, and
   an eccentric actuated by the lever and responsive to movement of the lever into the closed position to move the bushing along the stud towards the head.

2. The fastening device according to claim 1, wherein the bushing is electrically conductive.

3. The fastening device according to claim 1, wherein the bushing blocks movement of the lever into the closed position in a first rotational position of the stud relative to the support structure.

4. The fastening device according to claim 1, wherein the eccentric is constructed in one piece with the lever.

5. The fastening device according to claim 1, wherein at least one of the outer wall of the module element and the leaf spring has a through recess which receives therein the bushing in rotationally fixed manner and is braced on the bushing between a clamping disc and a flange of the bushing.

6. The fastening device according to claim 1, wherein the bushing has an end face that faces the lever, the end face of the bushing defining at least one radial groove configured to engage a projection protruding from the eccentric when the lever is in the open position.

7. The fastening device according to claim 1, wherein the broadened head is constructed as a cone or a truncated cone.

8. The fastening device according to claim 1, wherein a compression spring acting between the bushing and the broadened head of the stud pretensions the stud in an assembly or disassembly position.

9. The fastening device according to claim 8, wherein the compression spring is supported on the section of the stud.

10. The fastening device according to claim 1, wherein the bushing has an electrically conductive coating.

11. A fastening system comprising the fastening device according to claim 1 and the support structure defining the support recess, the support recess comprising:
    a first region dimensioned for the broadened head of the stud to pass through,
    a second region having a diameter corresponding to the second lateral dimension of the section of the stud, and
    a guide section connecting the first region to the second region, the guide section having a lateral dimension corresponding to the first lateral dimension of the section of the stud.

12. The fastening system according to claim 11, wherein the first region of the support recess is disposed above the second region.

13. The fastening device according to claim 1, wherein the flattened locking portion cooperates with a locking projection of the lever to couple the lever to the bushing in a rotationally fixed manner when the lever is in the closed position.

14. A fastening device for attaching a module element to a support structure in an aircraft, the fastening device comprising:
    a stud having a first end defining a broadened head configured to engage in a support recess of the support structure and a section which adjoins the head and defines adjacent to the head first and second lateral dimensions, the second lateral dimension larger than the first lateral dimension and disposed at least substantially perpendicularly to the first lateral dimension, the stud further having a second end opposite the first end, the second end connected to a lever which is movable between open and closed positions relative to the stud, an electrically conductive bushing provided on and longitudinally movable along the stud, the electrically conductive bushing configured to contact the support structure and to support an outer wall of the module element, wherein the bushing defines an outer circumference between the broadened head and the second end of the stud, at least a portion of the outer circumference having a flattened locking portion, wherein the outer circumference of the bushing form-fittingly receives an electrically conductive leaf spring and is configured to receive the outer wall of the module element in a form-fitting manner, and wherein the flattened locking portion produces the form-fitting between the bushing the outer wall of the module element and the leaf spring, and an eccentric actuated by the lever and responsive to movement of the lever into the closed position to move the bushing along the stud towards the head.

15. The fastening device according to claim 14, wherein the bushing blocks movement of the lever into the closed position in a first rotational position of the stud relative to the support structure.

16. The fastening device according to claim 14, wherein the eccentric is constructed in one piece with the lever.

17. A fastening system comprising the fastening device according to claim 14 and the outer wall of the module element, the outer wall of the module element comprising a through recess which receives therein the bushing in rotationally fixed manner, the outer wall module element braced on the bushing between a clamping disc and a flange of the bushing.

18. The fastening device according to claim 14, wherein the bushing has an end face that faces the lever, the end face of the bushing defining at least one radial groove configured to engage a projection protruding from the eccentric when the lever is in the open position.

19. The fastening device according to claim 14, wherein the broadened head is constructed as a cone or a truncated cone.

20. The fastening device according to claim 14, wherein a compression spring acting between the bushing and the broadened head of the stud pretensions the stud in an assembly or disassembly position.

21. The fastening device according to claim 20, wherein the compression spring is supported on the section of the stud.

22. The fastening device according to claim 14, wherein the bushing has an electrically conductive coating.

23. A fastening system comprising the fastening device according to claim 14 and the support structure defining the support recess, the support recess comprising:

a first region dimensioned for the broadened head of the stud to pass through, a second region having a diameter corresponding to the second lateral dimension of the section of the stud, and a guide section connecting the first region to the second region, the guide section having a lateral dimension corresponding to the first lateral dimension of the section of the stud.

24. The fastening system according to claim 23, wherein the first region of the support recess is disposed above the second region.

25. The fastening device according to claim 14, wherein the flattened locking portion cooperates with a locking projection of the lever to couple the lever to the bushing in a rotationally fixed manner when the lever is in the closed position.

* * * * *